United States Patent

Kuwata

[11] Patent Number: 6,145,067
[45] Date of Patent: Nov. 7, 2000

[54] DISK ARRAY DEVICE

[75] Inventor: Atsushi Kuwata, Tokyo, Japan

[73] Assignee: NEC Corporation, Tokyo, Japan

[21] Appl. No.: 09/185,601

[22] Filed: Nov. 4, 1998

[30] Foreign Application Priority Data

Nov. 6, 1997 [JP] Japan .................................. 9-304058

[51] Int. Cl.[7] .................................................. G06F 12/02
[52] U.S. Cl. ........................ 711/165; 711/114; 711/170
[58] Field of Search .................................. 711/112, 114,
711/156, 161, 162, 165, 166, 168, 170,
173; 714/6

[56] References Cited

U.S. PATENT DOCUMENTS

| | | | |
|---|---|---|---|
| 5,390,187 | 2/1995 | Stallmo ........................................ | 714/7 |
| 5,574,851 | 11/1996 | Rathunde ..................................... | 714/7 |
| 5,584,018 | 12/1996 | Kamiyama ............................... | 711/165 |
| 5,657,468 | 8/1997 | Stallmo et al. .......................... | 711/114 |
| 5,758,118 | 5/1998 | Choy et al. ............................... | 711/114 |
| 5,809,224 | 9/1998 | Schultz et al. ............................... | 714/7 |
| 5,875,456 | 2/1999 | Stallmo et al. .......................... | 711/114 |
| 6,052,759 | 4/2000 | Stallmo et al. .......................... | 711/114 |
| 6,058,489 | 5/2000 | Schultz et al. ............................... | 714/7 |

FOREIGN PATENT DOCUMENTS

| | | |
|---|---|---|
| 62-160547 | 7/1987 | Japan . |
| 64-76313 | 3/1989 | Japan . |
| 3-103918 | 4/1991 | Japan . |
| 4-273548 | 9/1992 | Japan . |
| 4-370823 | 12/1992 | Japan . |
| 7-152498 | 6/1995 | Japan . |
| 8-263226 | 10/1996 | Japan . |
| 8-263231 | 10/1996 | Japan . |
| 9-6678 | 1/1997 | Japan . |

Primary Examiner—Hiep T. Nguyen
Attorney, Agent, or Firm—Foley & Lardner

[57] ABSTRACT

A disk array apparatus includes a plurality of physical disks forming a physical disk group which is logically divided into a plurality of unit areas. The unit areas are combined into a logical disk. This device includes a control section, a logical disk reconfiguration executing section, a P-EXTENT copying means, a read means, a write means, and a double write means. The control section controls an access to the logical disk in accordance with an external request. The logical disk reconfiguration executing section reconfigures the logical disk in accordance with an external request. The P-EXTENT copying means copies data from a unit area as a reconfiguration source to a unit area as a reconfiguration destination when the logical disk is reconfigured. The read means reads out data from a unit area. The write means writes data in a unit area that is not being reconfigured. The double write means writes data in both the unit area as the reconfiguration source and the unit area as the reconfiguration destination when the data is written in the unit area that is being reconfigured.

9 Claims, 4 Drawing Sheets

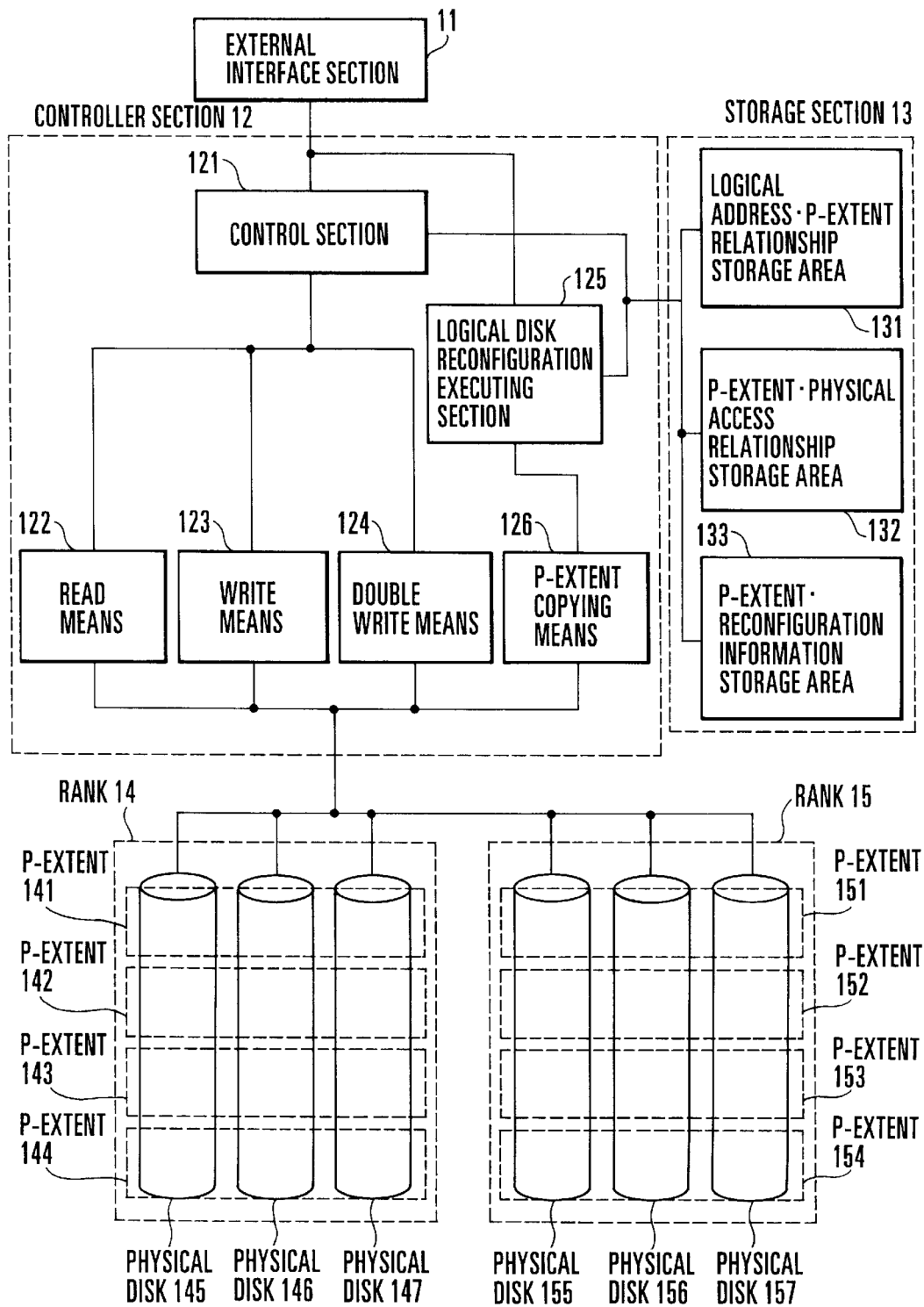
F I G. 1

DISK ARRAY DEVICE

Background of the Invention

The present invention relates to a disk array device using a combination of a plurality of physical disks to realize data redundancy and, more particularly, to a disk array device capable of dynamically reconfiguring logical disks.

Recently, disk array devices have been used for various information processing apparatuses. A disk array device is designed to realize high-speed access to data and high durability against failures by connecting a plurality of information storage media (physical disks) such as hard disks in parallel and synchronously controlling them as one storage unit.

In general, a disk array device has a plurality of physical disks. Since the processing speed of each physical disk is limited, the overall performance of the device is higher when accesses are distributed than when accesses concentrate on a specific physical disk. In degradation, in particular, since data generating operation is performed, if accesses concentrate on a degraded portion, the performance may greatly deteriorate. For this reason, it is preferable in terms of performance that accesses be distributed to physical disks as many as possible. That is, an excessive deterioration in performance can be prevented by distributing accesses to a plurality of physical disks instead of concentrating accesses to a specific logical disk.

In an information storage apparatus using such a disk array device, information is distributed and stored in a plurality of disks, and high reliability of data management is realized by using a parity disk. Assume that data cannot be read out from some disk of a plurality of physical disks required to construct one disk array device owing to a failure or the like. In this case, the information stored in the disk incapable of data read can be restored on the basis of the remaining disks constituting the disk array device.

Conventional techniques associated with such a disk array device are disclosed in Japanese Patent Laid-Open Nos. 03-103918, 04-370823, and 08-263226.

The disk array device disclosed in Japanese Patent Laid-Open No. 03-103918 uses a plurality of disk devices as one disk device to increase the data transfer rate between the memory and the disk devices.

In the disk array device disclosed in Japanese Patent Laid-Open No. 04-370823, the operation modes of the device are classified into a division mode in which the respective disk devices operate independently, an array mode in which the respective disk devices are combined into one logical device, and a mixed mode in which the above two modes are active. This disk array device allows arbitrary selection of an operation mode to offer some ranges of capacity per logical device and transfer rate, thereby improving the use efficiency in accordance with the use environment for a user.

In the disk array device disclosed in Japanese Patent Laid-Open No. 08-263226, a plurality of portable recording media are connected in parallel to logically construct one storage unit. This disk array device prevents unnecessary data from being restored owing to a cause other than a recording medium failure, e.g., temporary removal of a portable recording medium or a loss, and prevents redundant use of portable recording media, thereby improving reliability.

In a disk array device like those described above, since the configuration of a logical disk having a plurality of physical disks connected in parallel is basically fixed, when a physical disk is added afterward, the logical disk is reconfigured by formatting performed by an OS (Operating System) or the like. For this reason, even if a physical disk is added afterward, it is difficult to distribute disk accesses to the overall device including the existing physical disks and the added physical disk. Therefore, a satisfactory access distribution effect cannot be obtained.

In addition, in order to effectively distribute accesses to the added physical disk, the logical disk must be reconfigured after normal processing such as data write and read is stopped. This imposes great limitations on the utility of the device.

SUMMARY OF THE INVENTION

It is an object of the present invention to provide a disk array device with high extensibility, which can dynamically reconfigure a logical disk without stopping normal processing, and can distribute accesses to the overall device even if a physical disk is added afterward.

In order to achieve the above object, according to the present invention, there is provided a disk array apparatus including a plurality of physical disks forming a physical disk group which is logically divided into a plurality of unit areas, the unit areas being combined into a logical disk, comprising a control section for controlling an access to the logical disk in accordance with an external request, a reconfiguration executing section for reconfiguring the logical disk in accordance with an external request, data copying means for copying data from a unit area as a reconfiguration source to a unit area as a reconfiguration destination when the logical disk is reconfigured, read means for reading out data from a unit area, write means for writing data in a unit area that is not being reconfigured, and double write means for writing data in both the unit area as the reconfiguration source and the unit area as the reconfiguration destination when the data is written in the unit area that is being reconfigured.

BRIEF DESCRIPTION OF THE DRAWINGS

FIG. 1 is a block diagram showing a disk array device according to the first embodiment of the present invention;

DESCRIPTION OF THE PREFERRED EMBODIMENT

Figure 2:
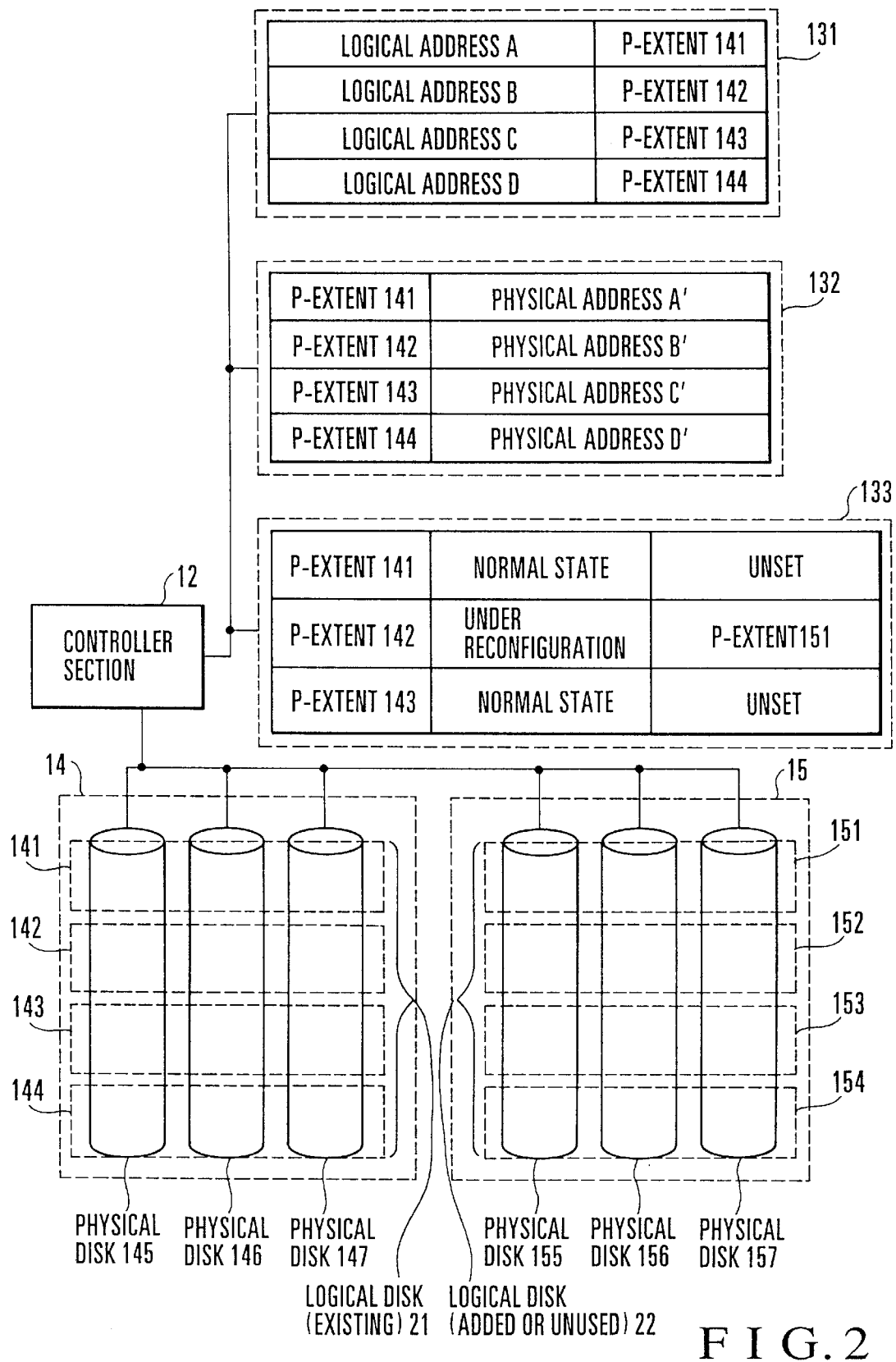
FIG. 2 is a block diagram showing an internal arrangement of the disk array device.

An embodiment of the present invention will be described in detail next with reference to the accompanying drawings.
First Embodiment FIG. 1 shows a disk array device according to the first embodiment of the present invention. This disk array device includes an external interface section 11 for designating a data read, a data write, and logical disk reconfiguration, a controller section 12 for controlling accesses to the logical disk and reconfiguration of the logical disk, a storage section 13 for storing information about the reconfiguration of the logical disk, and RANKs 14 and 15 each of which is a group of physical disks.

The controller section 12 is made up of a control section 121 for controlling an access to the logical disk in accordance with a request from the external interface section 11, a read means 122 for reading out data from a continuous area (to be referred to as a P-EXTENT hereinafter), on the logical disk, which is ensured to be used for a specific data set, a write means 123 for writing data in a P-EXTENT which is not being reconfigured, a double write means 124 for writing data in both a P-EXTENT as a reconfiguration source and a P-EXTENT as a reconfiguration destination when data is written in the P-EXTENT that is being reconfigured, a logical disk reconfiguration executing section 125 for reconfiguring the logical disk in accordance with a request from the external interface section 11, and a P-EXTENT copying means 126 for copying data from a P-EXTENT as a reconfiguration source to a P-EXTENT as a reconfiguration destination when the logical disk is reconfigured.

The storage section 13 comprises a logical address.P-EXTENT relationship storage area 131 for storing the relationship between the logical accesses and the P-EXTENTS, a P-EXTENT-physical access relationship storage area 132 for storing the relationship between the P-EXTENTs and the physical accesses, and a P-EXTENT.reconfiguration information storage area 133 for storing information about reconfiguration of each P-EXTENT.

As shown in FIG. 1, physical disks 145, 146, and 147 belong to the RANK 14 as a group of physical disks. The RANK 14 is logically divided into P-EXTENTs 141, 142, 143, and 144. The P-EXTENTs 141, 142, 143, and 144 constitute one logical disk.

Likewise, physical disks 155, 156, and 157 belong to the RANK 15 as a group of physical disks. The RANK 15 is logically divided into P-EXTENTs 151, 152, 153, and 154. The P-EXTENTs 151, 152, 153, and 154 constitute another logical disk.

Dynamic reconfiguration of a logical disk will be described next. A logical disk is reconfigured by replacing an arbitrary P-EXTENT as a component of the logical disk with an unused P-EXTENT.

First of all, upon reception of a request from the external interface section 11, the logical disk reconfiguration executing section 125 writes information, indicating that a P-EXTENT as a reconfiguration source is being reconfigured, and the number of a P-EXTENT as a reconfiguration destination in the P-EXTENT.reconfiguration information storage area 133.

The logical disk reconfiguration executing section 125 then controls the P-EXTENT copying means 126 on the basis of the contents stored in the logical address.P-EXTENT relationship storage area 131, the P-EXTENT.physical access relationship storage area 132, and the P-EXTENT.reconfiguration information storage area 133. With this control, the P-EXTENT copying means 126 copies the data in the P-EXTENT as the reconfiguration source to the P-EXTENT as the reconfiguration destination. After this data copying operation, the logical disk reconfiguration executing section 125 updates the contents of the logical address P-EXTENT relationship storage area 131 to make the logical address correspond to the P-EXTENT as the reconfiguration destination to be newly incorporated. Subsequently, an access to this reconfigured logical disk is performed with respect to the newly incorporated P-EXTENT.

An access to the logical disk is generally performed by the read means 122 and the write means 123.

When data is to be read from the logical disk during the above data copying operation, the read means 122 reads out the data from the P-EXTENT as the reconfiguration source. When data is to be written in the logical disk during the above data copying operation, the double write means 124 writes the data in both the P-EXTENT as the reconfiguration source and the P-EXTENT as the reconfiguration destination. This allows both a normal access to the logical disk and copying operation, thereby realizing dynamic reconfiguration of the logical disk.

This embodiment will be described in more detail next with reference to FIG. 2.

FIG. 2 shows an example of the internal arrangement of the disk array device. The same reference numerals in FIG. 2 denote the same parts as in FIG. 1.

Referring to FIG. 2, the RANK 14 composed of the physical disks 145, 146, an 147 is divided into the P-EXTENTs 141, 142, 143, and 144. This RANK 14 forms a logical disk 21 having a logical format constituted by the P-EXTENTs 141, 142, 143, and 144.

Similarly, the RANK 15 composed of the physical disks 155, 156, and 157 is divided into the P-EXTENTs 151, 152, 153, and 154. This RANK 15 forms a logical disk 22 having a logical format constituted by the P-EXTENTs 151, 152, 153, and 154.

Assume that in the following description, the logical disk 21 is an existing logical disk, and the logical disk 22 is an unused (undefined) logical disk added afterward.

The logical address.P-EXTENT relationship storage area 131 stores numbers (corresponding logical formats) of the P-EXTENTs of the logical disk 21 which correspond to logical addresses A, B, C, and D. For example, the logical address A corresponds to the P-EXTENT 141; the logical address B, the P-EXTENT 142; the logical address C, the P-EXTENT 143; and the logical address D, the P-EXTENT 144. Note that this information is set when the logical disk is configured.

The P-EXTENT.physical access relationship storage area 132 stores physical addresses corresponding to the respective P-EXTENTs. For example, the P-EXTENT 141 corresponds to a physical address A'; the P-EXTENT 142, a physical address B'; the P-EXTENT 143, a physical address C'; and the P-EXTENT 144, a physical address D'. Note that this information is set when the respective physical disks are connected to each other to form the RANK.

The P-EXTENT.reconfiguration information storage area 133 stores reconfiguration information about each P-EXTENT. For example, information indicating that the P-EXTENT 141 is in the normal state (not being reconfigured) is stored in a state area, of the P-EXTENT.reconfiguration information storage area 133, which corresponds to the P-EXTENT 141. Information indicating that the P-EXTENT 142 is being reconfigured is stored in a state area, of the P-EXTENT.reconfiguration information storage area 133, which corresponds to the P-EXTENT 142. In addition, P-EXTENT number 151 is stored in a reconfiguration destination P-EXTENT number area of the storage area 133. Information indicating that the P-EXTENT 143 is in the normal state is stored in a state area, of the P-EXTENT.reconfiguration information storage area 133, which corresponds to the P-EXTENT 143. Note that since the P-EXTENTs 141 and 143 are in the normal state, no reconfiguration destination P-EXTENT numbers are set in reconfiguration destination P-EXTENT number areas corresponding to the P-EXTENTs 141 and 143.

A data write, a data read, and reconfiguration for a logical disk in the above arrangement will be described next.

Figure 3:
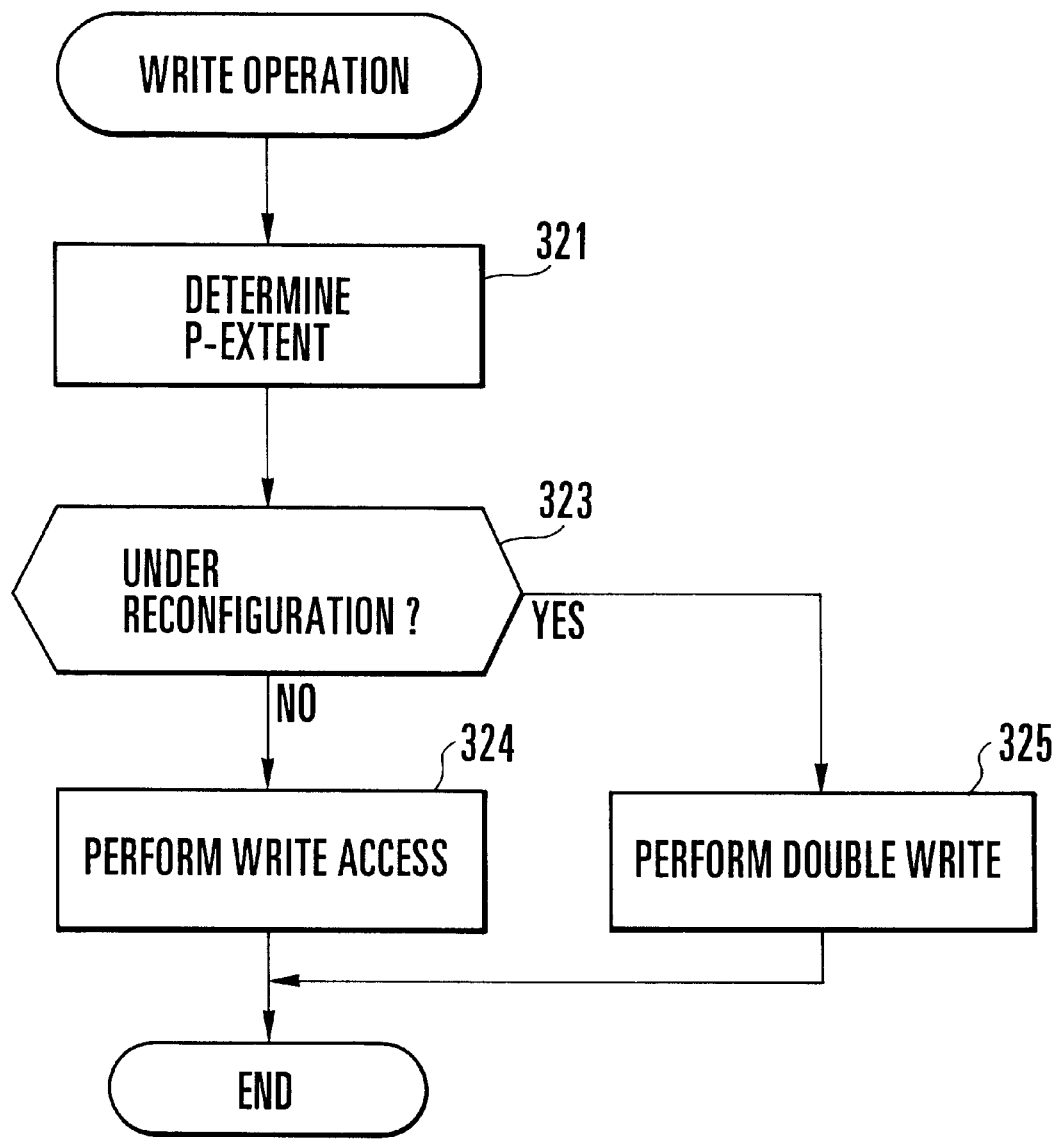
FIG. 3 is a flow chart showing data write operation for a logical disk in the first embodiment of the present invention.

FIG. 3 shows data write operation for the logical disk in the first embodiment of the present invention.

Figure 4:
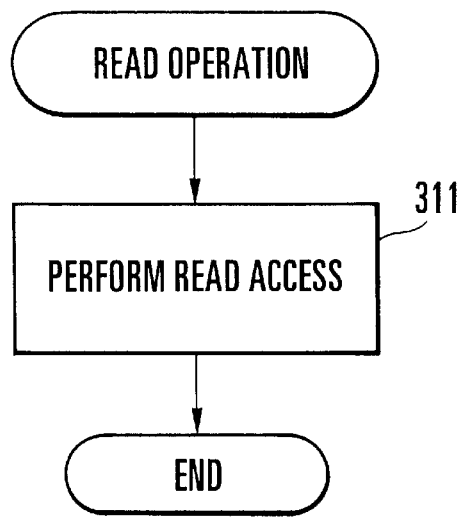
FIG. 4 is a flow chart showing data read operation for the logical disk in the first embodiment of the present invention.

FIG. 4 shows data read operation for the logical disk.

Upon reception of a write request for the logical disk from the external interface section 11, the control section 121 acquires the number of the P-EXTENT corresponding to the logical address at which data is to be written by referring to the logical address.P-EXTENT relationship storage area 131 (step 321 in FIG. 3). The control section 121 then refers to the state area, of the P-EXTENT.reconfiguration information storage area 133, which corresponds to the number of the P-EXTENT (to be referred to as the corresponding P-EXTENT hereinafter) acquired from the logical address.P-EXTENT relationship storage area 131. The control section 121 checks, on the basis of the information in this state area, whether the corresponding P-EXTENT is in the normal state or being reconfigured (step 323).

Upon determining that the corresponding P-EXTENT is in the normal state, the control section 121 controls the write means 123 to write data in the corresponding P-EXTENT. With this operation, the write means 123 writes the data in the corresponding P-EXTENT (steps 323 and 324).

Upon determining that the corresponding P-EXTENT is being reconfigured, the control section 121 refers to the reconfiguration destination P-EXTENT number area, of the P-EXTENT.reconfiguration information storage area 133, which corresponds to the corresponding P-EXTENT. The control section 121 then controls the double write means 124 to write the data in both the P-EXTENT (as the reconfiguration destination) corresponding to the number acquired from this number area and the corresponding P-EXTENT (as the reconfiguration source). With this operation, the double write means 124 writes the data both in the P-EXTENT as the reconfiguration source and the P-EXTENT as the reconfiguration destination (steps 323 and 325). In the case shown in FIG. 2, since the P-EXTENT 142 is being replaced with the P-EXTENT 151, if the write address is in the P-EXTENT 142, the data is written in both the P-EXTENT 142 and the P-EXTENT 151.

Upon reception of a read request for the logical disk from the external interface section 11, the control section 121 controls the read means 122 to read data from the corresponding P-EXTENT. With this operation, the read means 122 reads out the data from the corresponding P-EXTENT regardless of whether the corresponding P-EXTENT is in the normal state or being reconfigured (step 311 in FIG. 4).

Figure 5:
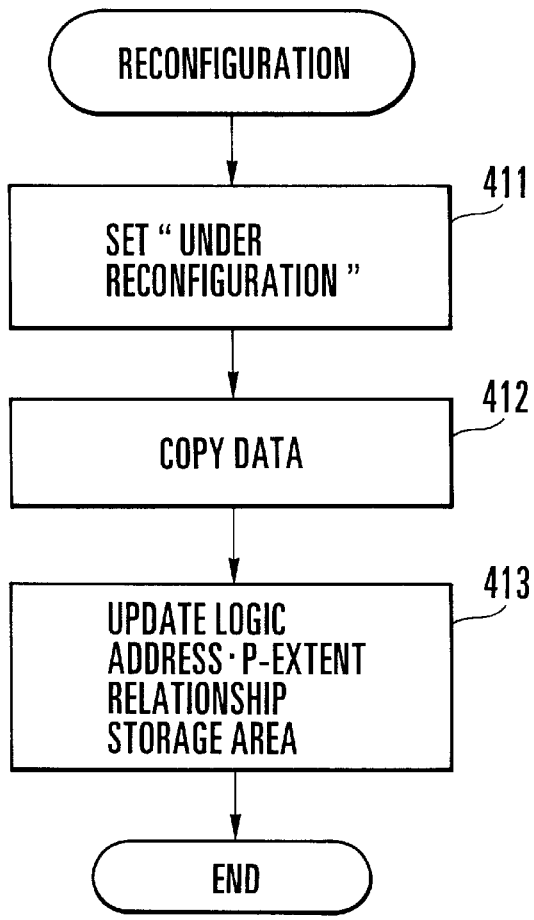
FIG. 5 is a flow chart showing logical disk reconfiguration in the first embodiment of the present invention.

FIG. 5 shows reconfiguration of the logical disk in the first embodiment of the present invention.

Upon reception of a request for logical disk reconfiguration from the external interface section 11, the logical disk reconfiguration executing section 125 sets the information in the state area, of the P-EXTENT.reconfiguration information storage area 133, which corresponds to the number of the P-EXTENT as the reconfiguration source to "under reconfiguration". In addition, the logical disk reconfiguration executing section 125 sets the number of the P-EXTENT as the reconfiguration destination in the reconfiguration destination P-EXTENT number area in the P-EXTENT.reconfiguration information storage area 133 (step 411 in FIG. 5). Note that the logical disk is reconfigured in accordance with a user's request through the external interface section 11 or a request automatically output from the OS through the external interface section 11 when a physical disk is to be added.

The logical disk reconfiguration executing section 125 controls the P-EXTENT copying means 126 on the basis of the contents stored in the logical address.P-EXTENT relationship storage area 131, the P-EXTENT.physical address relationship storage area 132, and the P-EXTENT.reconfiguration information storage area 133. With this operation the P-EXTENT copying means 126 copies the data in the P-EXTENT as the reconfiguration source to the P-EXTENT as the reconfiguration destination (step 412). After the data copying operation, the logical disk reconfiguration executing section 125 updates the contents of the logical address.P-EXTENT relationship storage area 131 to make the logical address correspond to the P-EXTENT as the reconfiguration destination to be newly incorporated (step 413). In the case shown in FIG. 2, the P-EXTENT 142 is being replaced with the P-EXTENT 151. Upon completion of the copying processing between these P-EXTENTs, the logical disk reconfiguration executing section 125 replaces the P-EXTENT 142 corresponding to the logical address B in the logical address.P-EXTENT relationship storage area 131 with the P-EXTENT 151.

As described above, the logical disk is reconfigured by sequentially copying the data in the P-EXTENT as the reconfiguration source to a logically undefined portion (e.g., an undefined portion for the OS) on the added physical disk. Note that reconfiguration of the logical disk may be performed in cooperation with a format program in the OS.

As has been described above, according to the first embodiment, since a logical disk including an existing logical disk and added physical disks can be dynamically reconfigured as a whole, disk accesses can be distributed to a larger number of physical disks. This makes it possible to increase the storage capacity of the disk array device when physical disks are added, and improve the performance of the device to the extent corresponding to the added physical disks without stopping any normal disk access.

What is claimed is:

1. A disk array apparatus including a plurality of physical disks forming a physical disk group which is logically divided into a plurality of unit areas, the unit areas being combined into a logical disk, comprising:

a control section for controlling an access to said logical disk in accordance with an external request;

a reconfiguration executing section for reconfiguring the logical disk in accordance with an external request;

data copying means for copying data from a unit area as a reconfiguration source to a unit area as a reconfiguration destination when the logical disk is reconfigured;

read means for reading out data from a unit area;

write means for writing data in a unit area that is not being reconfigured; and double write means for writing data in both the unit area as the reconfiguration source and the unit area as the reconfiguration destination when the data is written in the unit area that is being reconfigured.

2. A device according to claim 1, wherein the unit areas has a redundant arrangement constituted by some of said logically divided physical disks.

3. A device according to claim 1, further comprising:

first storage means for storing a relationship between logical addresses and said unit areas;

second storage means for storing a relationship between said unit areas and physical addresses; and third storage means for storing information about reconfiguration of said unit area.

4. A device according to claim 3, wherein said control section controls said read means, said write means, and said double write means on the basis of an external access request for said logical disk and the contents stored in said first, second, and third storage means.

5. A device according to claim 3, wherein said reconfiguration executing section controls said data copying means to reconfigure said logical disk on the basis of an external reconfiguration request for said logical disk and the contents stored in said first, second, and third storage means.

6. A device according to claim 5, wherein said logical disk is reconfigured in consideration of a plurality of physical disks including an existing logical disk and added physical disks in a distributed manner.

7. A device according to claim 5, wherein said logical disk is reconfigured in accordance with addition of a physical disk.

8. A device according to claim 5, wherein the reconfiguration request for said logical disk is a request from a user or an OS.

9. A device according to claim 5, wherein said logical disk is reconfigured in cooperation with a format program in the OS.

\* \* \* \* \*